H. K. RAYMOND.
TIRE FABRIC.
APPLICATION FILED JAN. 12, 1911.
1,123,375.
Patented Jan. 5, 1915.
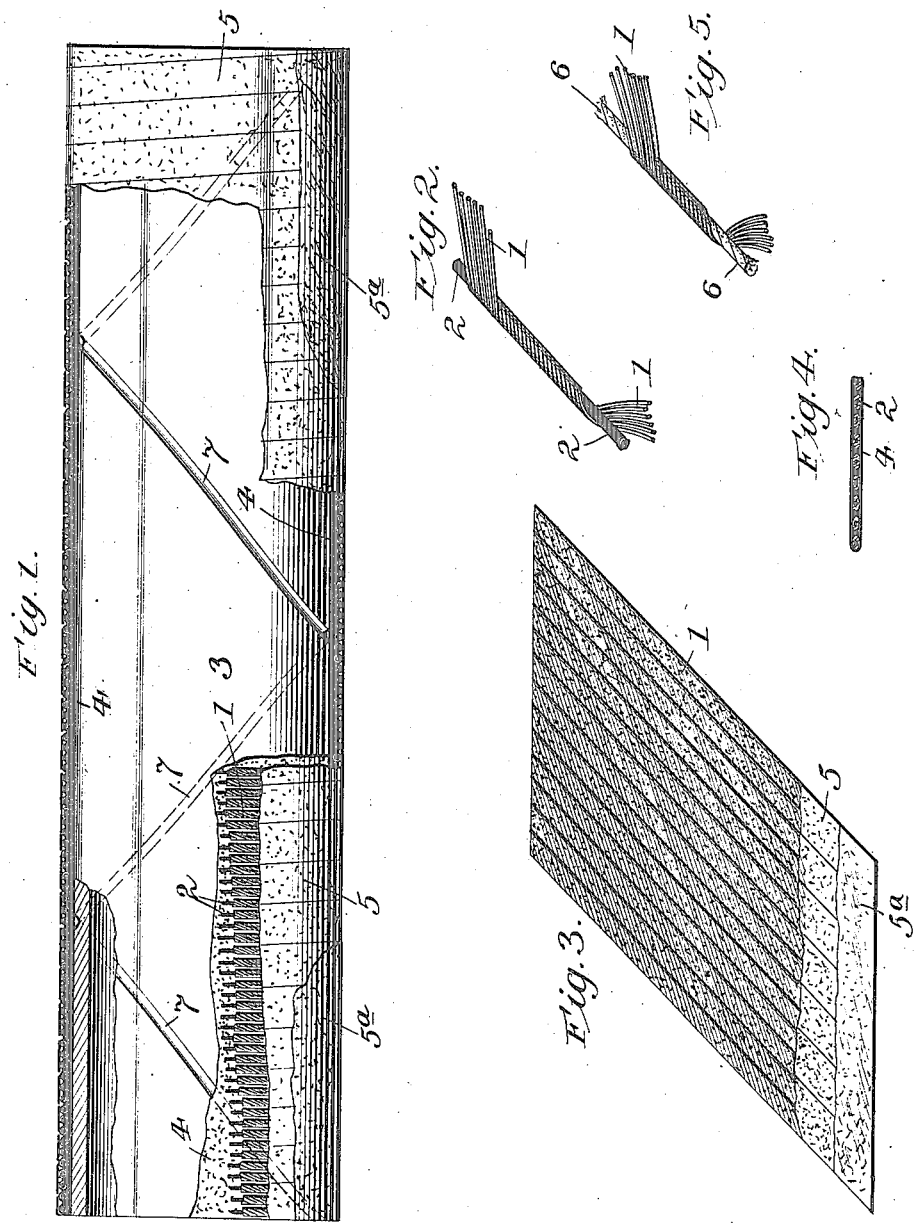

UNITED STATES PATENT OFFICE.

HARRY K. RAYMOND, OF AKRON, OHIO, ASSIGNOR, BY MESNE ASSIGNMENTS, TO THE B. F. GOODRICH COMPANY, A CORPORATION OF NEW YORK.

TIRE FABRIC.

1,123,375.      Specification of Letters Patent.      Patented Jan. 5, 1915.

Original application filed July 29, 1910, Serial No. 574,481. Divided and this application filed January 12, 1911. Serial No. 602,247.

*To all whom it may concern:*

Be it known that I, HARRY K. RAYMOND, a citizen of the United States, residing at Akron, in the county of Summit and State of Ohio, have invented certain new and useful Improvements in Tire Fabrics, of which the following is a specification.

My present invention pertains to an improved fabric for use in tire construction, and more particularly tires for motor vehicles.

The main object of the invention is to produce a fabric which will readily adapt itself to a mandrel about which the fabric is laid during the process of building-up the tire, and to so construct the fabric that when the same is cured there will be produced a homogeneous body with flexible cords extending therethrough.

The structure, which is more or less difficult to illustrate, is sought to be shown in the annexed drawings, wherein:

Figure 1 is a sectional view of a mandrel, showing the fabric in section at the upper portion thereof, while at the lower portion it is broken away in steps to disclose the various portions of the fabric; Fig. 2 a perspective view of a piece of one form of the cord, the outer threads being shown as removed from the ends of the rubber core; Fig. 3 a perspective view showing a piece of the fabric, the outer rubber covering being removed or omitted except at the right-hand end thereof; Fig. 4 a sectional view of the completed fabric; and Fig. 5 a view similar to Fig. 2, illustrating a cord having a soft or yielding core made of a material other than rubber.

In building up the core, single threads, as 1, Fig. 2, are drawn through a rubber cement and such cement is partially dried in a heated chamber. The threads are then twisted around a center core 2, which is preferably of rubber, either partially vulcanized in order to better retain its form, or raw. The finished cord is then wound around a mandrel, as 3, previously covered with unvulcanized rubber 4, a slight space preferably being left between the various convolutions in order that the rubber 4 may pass in between such convolutions, as is clearly indicated in the upper portion of Fig. 1. The cords are then spread with cement and a strip of thin rubber 5 is preferably wound over the cords to better hold the same in position after the fabric thus produced is cut into strips or lengths, as well as to act as a binder between the plies when made into the tire. When vulcanized, the parts are flexibly bound together by the rubber.

In lieu of assembling the parts as above set forth, the following steps may be carried out: A strip of unvulcanized rubber, as 4, is placed upon the mandrel, and the cords wound thereon, a second strip or sheet of unvulcanized rubber, as 5, being placed over the cords, and finally a strip of canvas $5^a$ is wrapped about the outermost sheet. This wrapping of canvas will produce sufficient pressure to force the rubber of the sheets between the cords, and owing to the absence of cement, which is employed under the method above described, there is less tendency for the core of the cords to become softened and squeeze or ooze out from the spirally-wound threads, the cement having a tendency to soften the core and permit the material of the core to ooze out.

By the employment of an elastic core or center, there is obtained a cord in which all the threads are twisted under exactly the same tension and are of the same length, or, in other words, there are no straight threads or threads whose lengths would be less than that of the majority. The cord produced in this manner is strong and firm, yet slightly extensible and elastic. This elasticity is afforded by the construction as above set forth, for when the strain is put upon the cord the threads which are spirally wound to form the cord tend to straighten, condensing the elastic core, the cord as a whole becoming slightly less in diameter at such moment. The threads in each cord are in and of themselves substantially inextensible, but the cord as a whole is slightly extensible.

While the central core of raw rubber is preferred and in practice is found highly efficient, it is conceivable that a core formed of other material, such as loose or broken cotton, which may be treated with a rubber solution, as at 6, in Fig. 5, may be employed. Such core in the main would be substantially the same as a raw rubber core.

When the fabric as a whole is vulcanized, either after or before being built up in the tire, the rubber of the core and of the facing sheets permeates the threads and the fibers thereof, binding the various cords together and forming in effect a fabric homogeneous throughout.

The mandrel may be provided with spirally-disposed grooves 7 in its face, in order to facilitate the severance of the fabric into strips or sections, if so desired.

While I have set forth somewhat at length the production of a fabric having the cords forming the major portion thereof, it is to be understood that the cords may be employed separately and placed in the body of the tire as required, as it is built up. No claim is herein made to such cords, the same forming the subject-matter of my original application filed on or about the 29th day of July, 1910, Serial No. 574,481, of which this is a division.

Having thus described my invention, what I claim is:

1. As a new article of manufacture, a fabric for tires, composed of a series of cords laid side by side, each cord comprising an elastic core and a plurality of fibrous threads wound spirally around the same, the cords being secured together by rubber applied thereto.

2. As a new article of manufacture, a fabric for tires, composed of a series of cords laid adjacent to each other, each cord comprising a rubber core having wound loosely about it, in a spiral relation, a plurality of fibrous threads; and a coating of rubber embracing the cords and holding the same together in a homogeneous mass or structure.

3. As a new article of manufacture, a fabric for tires, composed of a series of extensible and contractible cords, each cord having a rubber core; a sheet of rubber underlying the cords and passing in between the same; and a strip of rubber overlying the opposite face of the cords.

4. As a new article of manufacture, a fabric for tires, composed of a series of cords, each cord having a rubber core with a series of threads wound spirally about the core; a layer of rubber placed upon one side of the cords; and a layer of rubber and canvas secured upon the other side of the cords.

In testimony whereof I have signed my name to this specification in the presence of two subscribing witnesses.

HARRY K. RAYMOND.

Witnesses:
W. C. HEMENOVER,
H. E. JOY.